United States Patent
Hoehne et al.

(10) Patent No.: US 11,275,969 B2
(45) Date of Patent: Mar. 15, 2022

(54) VISUALLY-AWARE ENCODINGS FOR CHARACTERS

(71) Applicant: SAP SE, Walldorf (DE)

(72) Inventors: Johannes Hoehne, Berlin (DE); Marco Spinaci, Berlin (DE)

(73) Assignee: SAP SE, Walldorf (DE)

( * ) Notice: Subject to any disclaimer, the term of this patent is extended or adjusted under 35 U.S.C. 154(b) by 322 days.

(21) Appl. No.: 16/704,940

(22) Filed: Dec. 5, 2019

(65) Prior Publication Data

US 2021/0174141 A1 Jun. 10, 2021

(51) Int. Cl.
*G06K 9/62* (2006.01)
*G06F 16/51* (2019.01)
*G06N 3/04* (2006.01)
*G06N 3/08* (2006.01)
*G06F 40/53* (2020.01)

(52) U.S. Cl.
CPC ........... *G06K 9/6256* (2013.01); *G06F 16/51* (2019.01); *G06K 9/6268* (2013.01); *G06N 3/04* (2013.01); *G06N 3/08* (2013.01); *G06F 40/53* (2020.01); *G06K 2209/013* (2013.01)

(58) Field of Classification Search
CPC ............... G06K 9/6256; G06K 9/6268; G06K 2209/013; G06K 9/6267; G06K 9/00456; G06K 9/2054; G06K 9/6215; G06K 9/6232; G06K 9/6277; G06K 2209/01; G06F 16/51; G06F 40/53; G06N 3/04; G06N 3/08; G06N 3/0454; G06N 3/0481
USPC ........................................................ 382/161
See application file for complete search history.

(56) References Cited

U.S. PATENT DOCUMENTS

| | | | | |
|---|---|---|---|---|
| 5,337,370 A | * | 8/1994 | Gilles | G06K 9/6292 382/102 |
| 10,346,549 B1 | * | 7/2019 | Fesbinder | G09B 19/06 |
| 2010/0306249 A1 | * | 12/2010 | Hill | G06Q 50/01 707/769 |

OTHER PUBLICATIONS

Zhuoyao et al "Multi-Font Printed Chinese Charac ter Recognition Using Multi-Pooling Convolutonal Neural Network", 2015 13th International Conference on Document Analysis and Recognition (ICDAR), Aug. 23, 2015, 5 pages.
Dai et al. "Glyph-Aware Embedding of Chinese Characters" Cornell University Library, Aug. 31, 2017, 6 pages.
Romero et al. "Optical Chiinese Character Recognition Using Probabilistic Neural Networks", Pattern Recognition, Elsevier, GB, vol. 30, No. 8, Aug. 1, 1997, 14 pages.
Extended European Search Report, for EP Application No. 20207392. 0-1207, dated Apr. 29, 2021, 9 pages.

* cited by examiner

*Primary Examiner* — Charlotte M Baker
(74) *Attorney, Agent, or Firm* — Fountainhead Law Group P.C.

(57) ABSTRACT

In some embodiments, a method inputs a set of images into a network and trains the network based on a classification of the set of images to one or more characters in a set of characters. The method obtains a set of encodings for the one or more characters based on a layer of the network that restricts the output of the layer to a number of values. Then, the method stores the set of encodings for the one or more characters, wherein an encoding in the set of encodings is retrievable when a corresponding character is determined.

20 Claims, 8 Drawing Sheets

702 — neighboring labels for 入:
['又', 'X', '冬', '天', 'X'] #bits flipped: [7 7 7 7 7 7 8]

704 — neighboring labels for 入:
['X', '乂', '六', '宍', '穴', '入', '天'] #bits flipped: [7 7 8 8 9 9 10]

706 — neighboring labels for 瓜:
['爪', '瓜', '瓜', '弧', '延', '爻', '乂'] #bits flipped: [9 10 10 10 10 11 11]

708 — neighboring labels for 爪:
['瓜', '沢', '米', '爪', '玊', '师', '汉'] #bits flipped: [9 10 10 11 11 11 11]

710 — neighboring labels for 雪:
['雷', '霞', '霰', '臂', '骨', '簝', '置'] #bits flipped: [4 8 9 9 9 9 9]

712 — neighboring labels for 雷:
['雷', '霞', '霰', '肾', '萕', '置'] #bits flipped: [4 7 8 8 9 9 9]

VISUALLY-AWARE ENCODINGS FOR CHARACTERS

BACKGROUND

Different languages may be based on different scripts, which may be a writing system used to write characters of the languages. For example, English and German are based on a Latin script, which is an alphabetic script with a small alphabet including fewer than 100 characters. Other languages may use logographic scripts with a significantly larger set of characters. One example is Mandarin, which includes more than 8,000 unique characters. The English and Mandarin alphabet have different linguistic structures, visual structures, meanings, and statistical frequencies.

When a computer is used to process textual information for different languages, the characters need to be first encoded in a machine-readable format. Each character of the language may be assigned a unique encoding. Typically, the encoding has no semantic meaning in that an encoding of a first character has no relationship to an encoding for a second character. This may make training an application to recognize the characters less efficient and also cause resulting output to have recognizable errors.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a language encoding system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

In some embodiments, a system may generate encodings that represent characters in a language. For example, the encodings may be in a machine readable format (e.g., binary codes). The system generates the encodings based on a similarity between characters in a language. For example, the encodings may be based on a visual similarity of symbols in the language. The similarity may be based on glyph structure, where a glyph is an elemental symbol within an agreed set of symbols that are intended to represent a readable character in the language. In some embodiments, the symbols that are visually similar may also share a semantic similarity in the language, but this may not be the case for all visually similar characters.

By generating similar encodings for characters that are considered visually similar may be advantageous when an application is processing text of the characters. For example, the encodings may offer error robustness in that if a single bit or small number of bits in an encoding is incorrectly predicted, the outputted character may still be a character that is visually similar to the correct character. Also, there is a chance that if only a single bit is incorrectly predicted, the encoding may still be used to determine the correct character. Further, even if the wrong character is selected, outputting a visually-similar character may be less confusing to a user than outputting a visually dissimilar character from the correct character. Also, the training of a process that is configured to learn a character may be trained faster if the encodings are based on visual characteristics because visually similar characters may likely share many bits in a representation. It will therefore be easier for the process to learn the bits that are similar and then focus on the more challenging bits to distinguish between the visually similar characters.

System Overview

Figure 1:
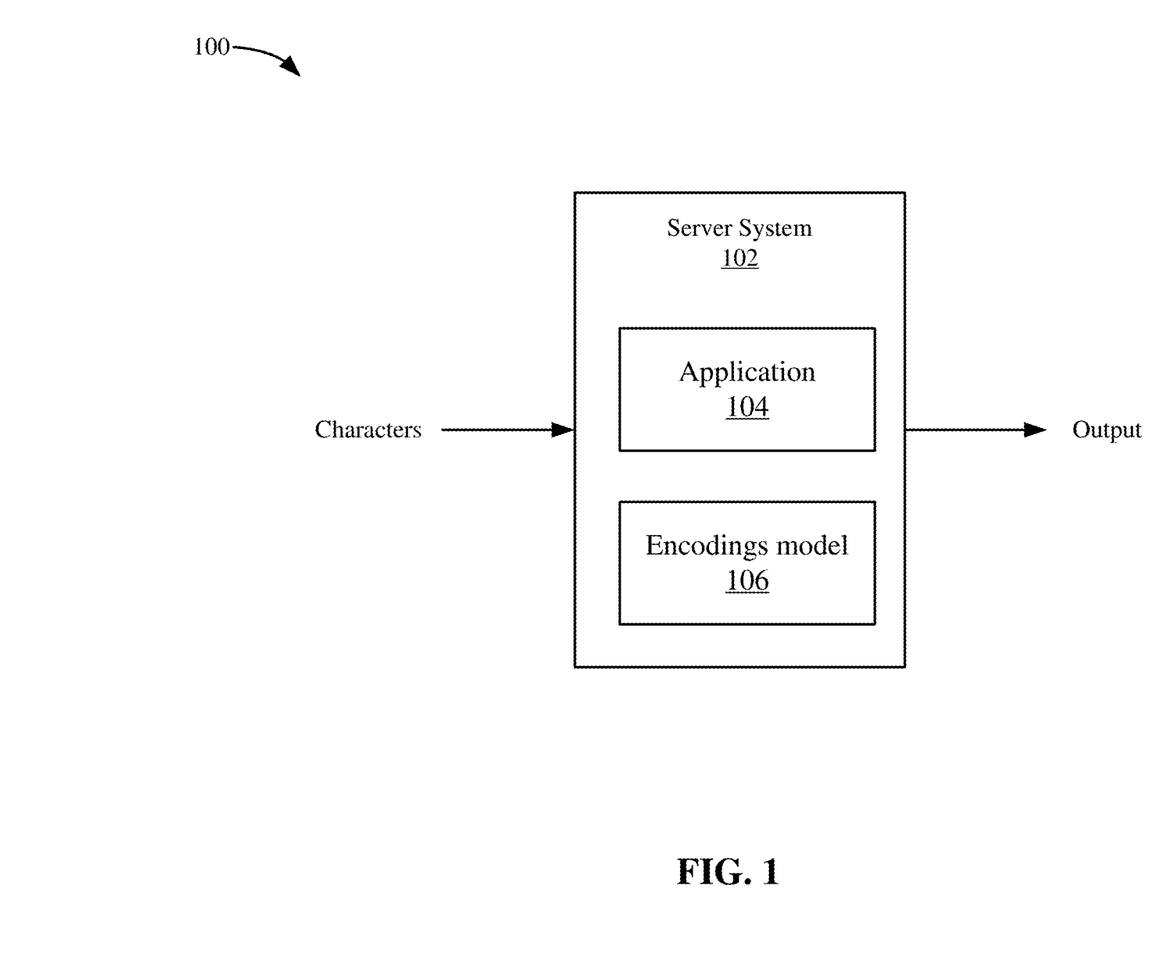
FIG. 1 depicts a simplified system for generating encodings for characters according to some embodiments.

FIG. 1 depicts a simplified system 100 for generating encodings for characters according to some embodiments. The characters may be from a specific language, such as Mandarin, or other logographic-related languages. However, system 100 may be used to generate encodings for any language or multiple languages.

An application 104 may be configured to receive characters, such as a visual representation of characters, and generate encodings for the characters. The visual representation may be a textual representation of characters. The characters may be logographic in which characters are marked by a letter, symbol, or sign that is used to represent an entire word or phrase. The encodings may be machine readable encodings, such as a series of binary codes. However, the encodings may be any representation for the characters that can be read, such as a series of letters or numbers.

Application 104 may use the encodings to generate an output. For example, application 104 may be an optical character recognition (OCR) engine that receives an image and outputs the text from the image. Application 104 may then analyze the text to generate encodings for characters in the text. Once generating the encodings, application 104 may use the encodings to generate an output, which may be the translation of the characters into another language, such as English. Other output may include a representation that corresponds to the recognized characters, such as a Pinyin version of the corresponding characters or the actual visual representation of the characters. Various outputs may be appreciated.

Application 104 may use an encodings model 106 to generate the encodings. Encodings model 106 may include the corresponding encodings for characters in the language. Encodings model 106 may also include any parameters for a process that is used by application 104 to recognize characters and generate the corresponding encodings. For example, application 104 may use a prediction network that receives an image of a character, and generates an encoding based on encodings model 106. Then, application 104 generates output for the encoding, such as a transaction of the character in another language.

As will discussed in more detail below, encodings for visually similar characters may also be similar. In some embodiments, the encodings may be binary numbers, such as a binary number of N binary numbers (e.g., 010001). As will be discussed in more detail below, encodings model 106 may include encodings that are more similar for visually similar characters. That is, a number of bits may be similar in the encodings for visually similar characters. A similar encoding may mean that a number of bits in the similar encodings are equal, such as above a threshold, out of a total number N bits. For example, the three symbols 雨 (the English word "rain"), 雪 (the English word "snow"), 雷 (the English word "thunder") have a similar meaning in the Mandarin language, and they all have a common substructure 雨. Therefore, encodings model 106 may use a glyph-aware encoding function E in which the E(雪) is more similar to E(雷) than to E(打) (the English word "hit"). To generate the similar encodings for visually similar characters, server system 102 trains a network to generate the encodings in encodings model 106.

Using the encodings that are visually aware, such as glyph aware, to encode logographic scripts have multiple advantages. For example, when an encoding is used by application 104, such as to generate the output of application 104, advantages may result when errors occur when an application selects the encoding. For example error robustness is provided if application 104 is predicting a given glyph (e.g., symbol 雪 (snow)) through a glyph-aware encoding of a certain amount of bits N with a slightly redundant N (e.g., $2^N>x$, with x being the total number of admissible characters), there is a much better chance that if a single bit is incorrectly predicted, the output of the system with the error may still match the correct character. That is, not all combinations of bits may be used, but the closest pattern to the predicted bit pattern may be the correct encoding for the character. Thus, the additional bits may be used for error-robust redundancy.

Also, using the encodings may produce fewer grave errors for application 104. For example, in a situation where one, or a few, bits are incorrectly predicted for application 104, even if this error is enough to change the prediction to a different character, the resulting character may likely be visually similar, such as the symbol thunder 雷 is to the symbol snow 雪. Seeing the thunder character in place of the snow character may be much less confusing to a user than if a completely random character was inserted in the position by application 104.

Also, the encodings based on visually similar characters may also make learning the representations faster. A process that needs to learn a character as an output will learn faster if the encoding is visually aware. This is because visually similar characters will likely share many bits in the representation. It will therefore be easier for the process to learn these bits and make a focus on more challenging bits to learn allowing the process to distinguish between visually similar characters. For example, application 104 may include an optical character recognition application. Using the visually aware encodings, encodings model 106 may learn the commonalities as well as the differences of symbols faster by first learning the easier bits that can be predicted for a character. The same applies to scene text recognition (STR) that recognizes scenes in images, such as a landmark in a picture. Further, errors as discussed above, in the output may be easier to understand for a human reader.

Application 104 may also be used for rendering of characters, such as generation of text that simulates handwritten text. Application 104 may receive a representation of text as bits for input and generate images as output. The generated image may represent the same character as the input, but at the same time look handwritten in style (plus potentially other conditions, such as having a homogeneous style, etc.). In this case, using the encodings for the input bits of the representation has advantages because it facilitates the task of application 104 to generate the images, which can intrinsically learn that a specific bit typically corresponds to a stroke in a specific position due to the similarity of encodings to visually similar characters.

Training

Figure 2:
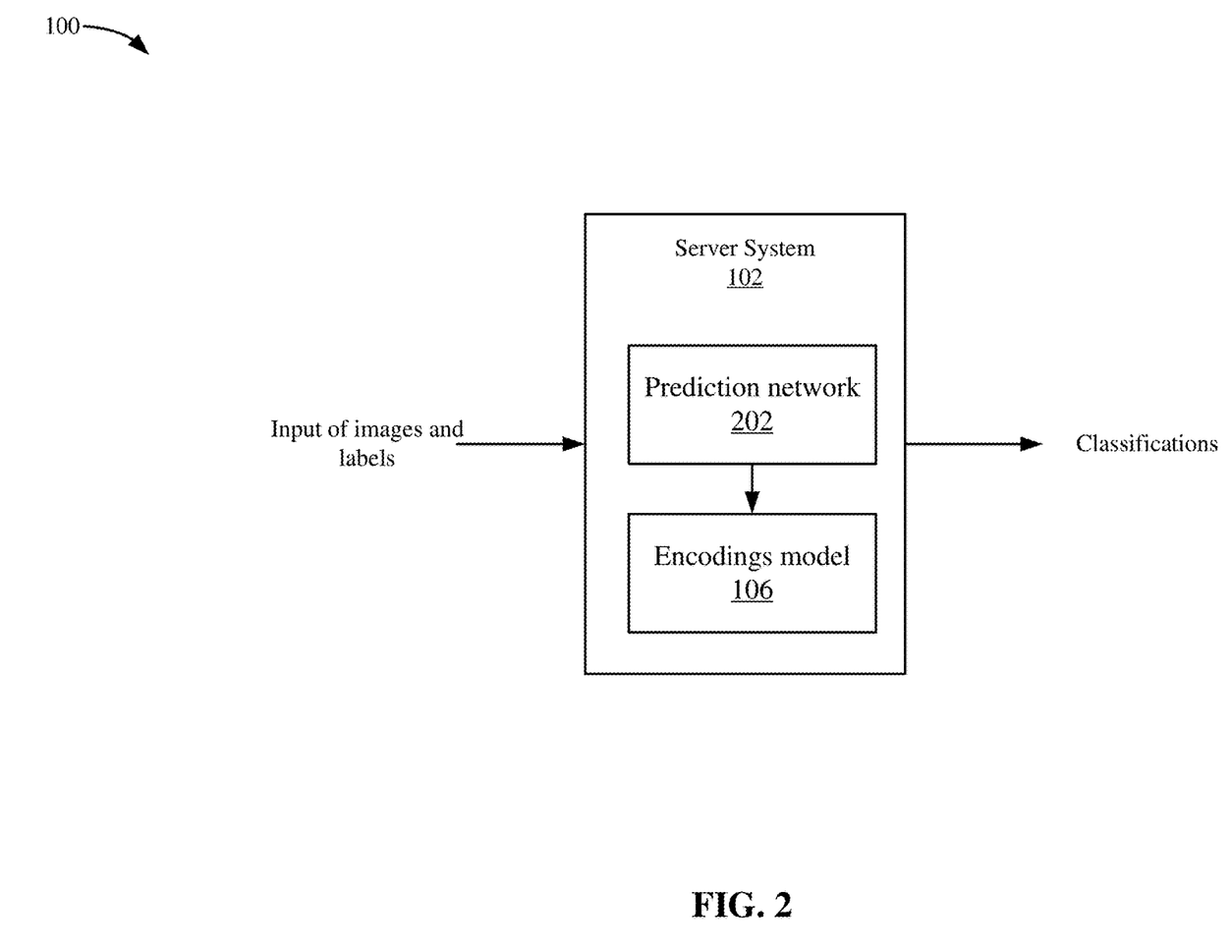
FIG. 2 depicts an example of training a prediction network to generate an encodings model according to some embodiments.

FIG. 2 depicts an example of training a prediction network 202 to generate encodings model 106 according to some embodiments. Server system 102 uses a prediction network 202 that can receive an input of images and output classifications for the images. The input of images may be images of characters for the language. The classifications may be a label that is predicted for the character. For example, prediction network 202 receives a symbol for the word rain and outputs a label for the symbol 雨.

Figure 3:
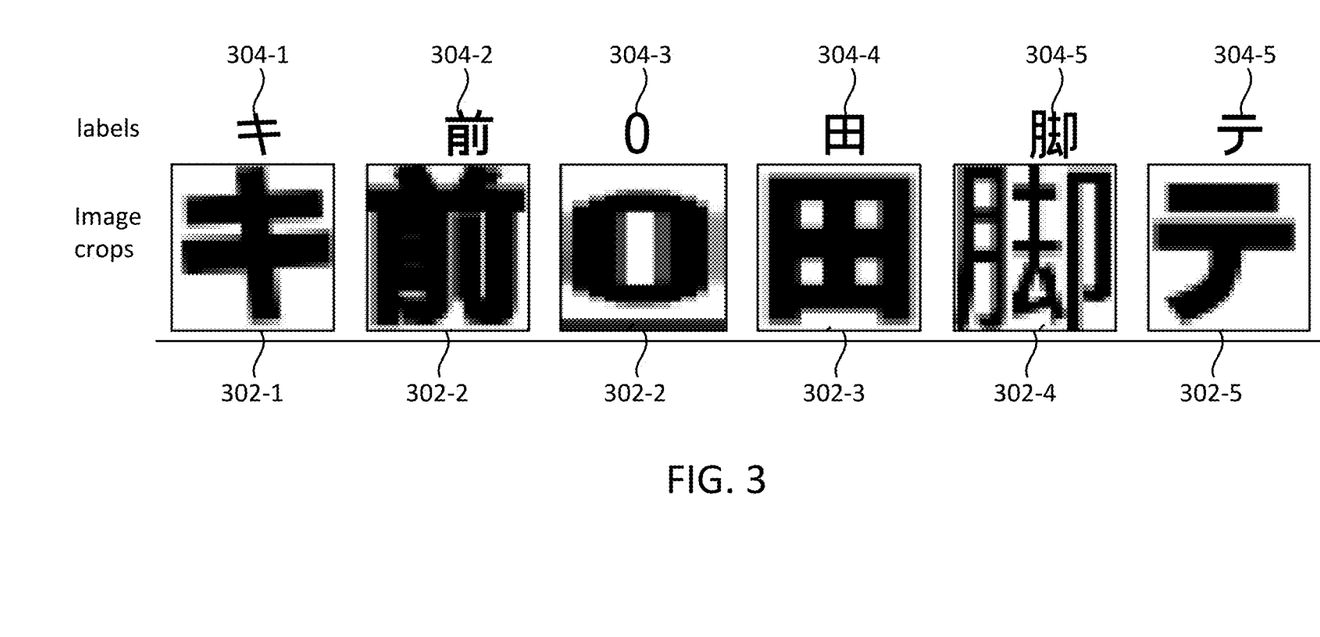
FIG. 3 depicts an example of labels and images according to some embodiments.

FIG. 3 depicts an example of labels and images according to some embodiments. The images may be cropped from different documents and include an image of a character. As shown, at 302-1 to 302-5, different symbols for a language have been cropped. Also, corresponding labels for each image crop may be provided, such as at 304-1 to 304-5.

Referring back to FIG. 2, prediction network 202 is trained to classify the image crops with a label. An input of images and corresponding labels is received from a number of documents that contain characters of a language in which the encodings are generated. The documents may contain all of the characters or a large amount of characters in the language. In some embodiments, the labels may be provided by a user or machine and are the correct label for the character in the image crop. For example, a set of documents may be written in the Mandarin language and a result of applying an optical character recognition engine to the document indicates the location of each character and a label for the character. Alternatively, a searchable document that is rendered may be created from arbitrary characters in the language and the renderer may automatically know the location and identification for each character.

Figure 4:
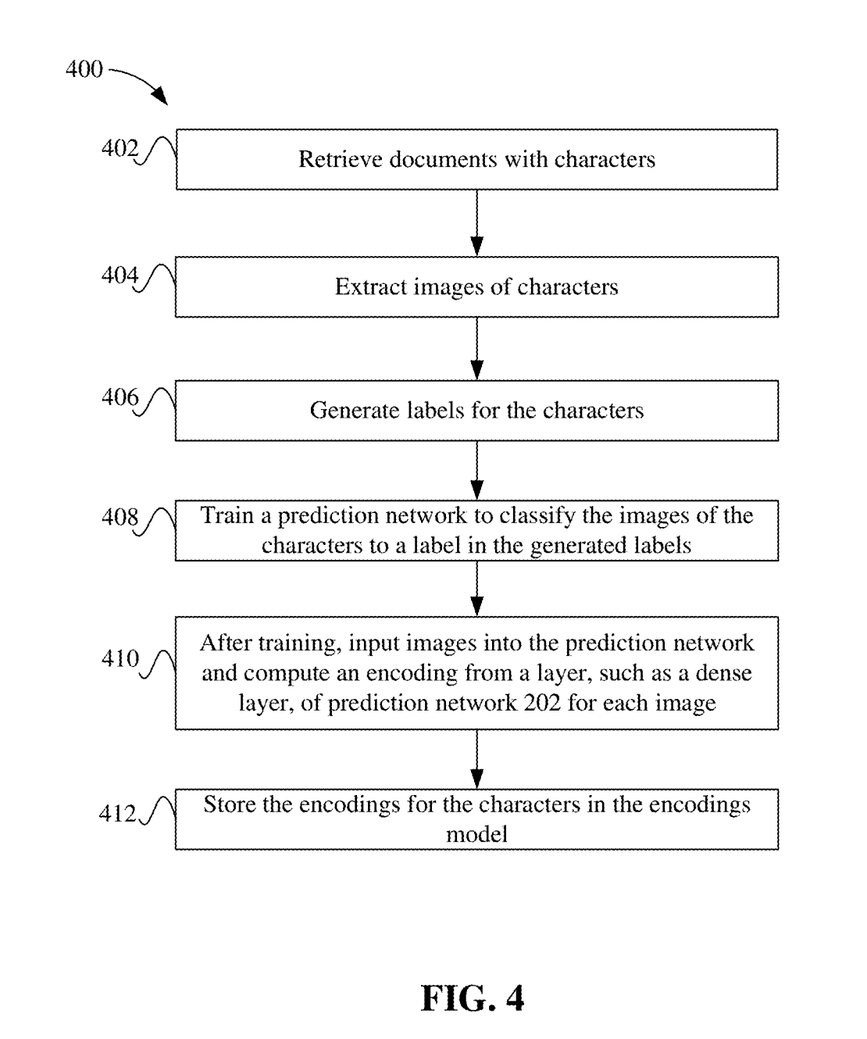
FIG. 4 depicts a simplified flowchart of a method for training the prediction network according to some embodiments.

FIG. 4 depicts a simplified flowchart 400 of a method for training prediction network 202 according to some embodiments. At 402, server system 102 retrieves documents with characters. At 404, server system 102 extracts images of the characters. At 406, server system 102 generates labels for the characters.

At 408, server system 102 trains prediction network 202 to classify the image-crops of the characters to the corresponding character label. There may be K unique characters and therefore, the output of prediction network 202 performs a classification task with K classes. That is, given an image crop, prediction network 202 may output a value, such as a vector of dimension K, having a value at an index corresponding to the classification. For example, each character in a language may be associated with a vector of a dimension K. Then, the output of prediction network 202 may correspond to one of the vectors for a character. This character is the classification for the image.

In some embodiments, the encoding value is different from the output value for the classification. For example, to obtain the encoding, prediction network 202 may include a layer that outputs the encoding in a fixed dimension N, which matches the target dimension (e.g., a length or number of bits) of the binary encoding. That is, if the encodings are each 10 bits, then the value of N is "10". The layer that outputs the encoding may be different from the layer that outputs the classification. For example, the layer that outputs the encoding may be an internal layer (e.g., an intermediate representation) in prediction network 202 and the layer that outputs the classification may be the output layer of prediction network 202 or the last layer. The value of N may be significantly smaller than K, which implies that the internal representation is more compact than the number of classes.

Referring back to FIG. 4, at 410, after training, server system 102 inputs images into prediction network 202 and computes an encoding from a layer, such as a dense layer (described below), of prediction network 202 for each image. Then, at 412, server system 102 stores the encodings for the characters in encodings model 106.

Prediction Network

The encodings may be generated from prediction network 202 in different ways. In some embodiments, a layer, such as a bottleneck layer, in prediction network 202 may output a value in a fixed dimension N, which matches the target dimension of the encoding. During the training, parameters in prediction network 202 is adjusted to accurately predict labels for the images. For example, prediction network 202 may output a classification for images. Then, the classification output by prediction network 202 is compared to labels 304 and the parameters in prediction network 202 are adjusted during the training process such that prediction network 202 can accurately predict a classification for images based on labels 304.

Figure 5:
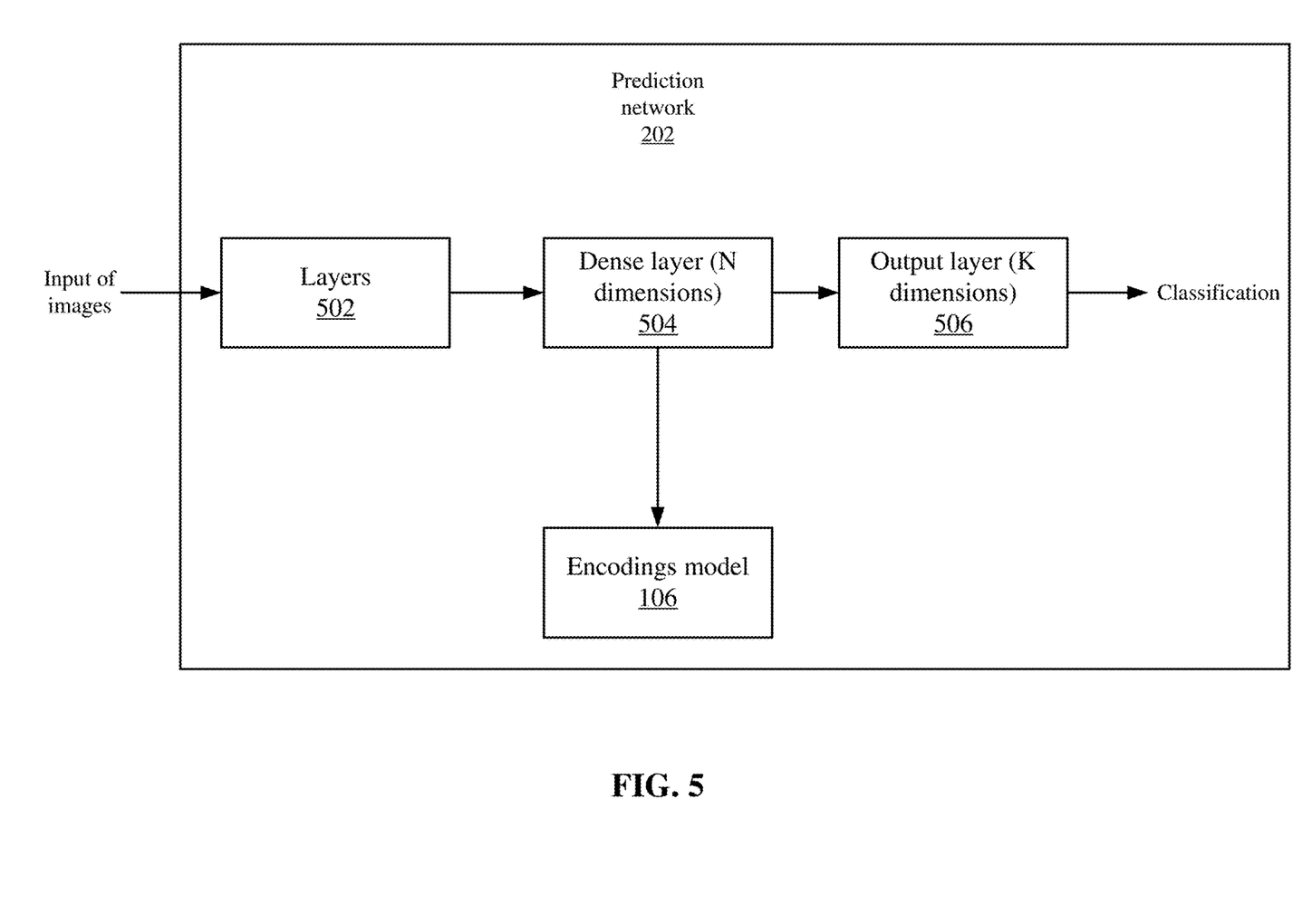
FIG. 5 depicts a more detailed example of the prediction network according to some embodiments.

FIG. 5 depicts a more detailed example of prediction network 202 according to some embodiments. Prediction network 202 includes layers 502 that receive an input of images and process those images. For example, the input of images may be images 302-1 to 302-5, and other images. In some embodiments, layers 502 may be two-dimensional (2D) convolutional layers that process characteristics in the images. Layers 502 may process the images to perform operations on characteristics of the images to analyze characteristics of the images. This may include layers of different dimensions or size of filters, and the operations may include pooling operations to reduce resolution, activation functions, etc. Layers 502 also include a flattening layer to flatten the image to a vector.

Layers 502 may also include a number of dense layers may also be included. A dense layer transforms the vector using a number of filters, activation functions, etc. Different variations of layers 502 may be appreciated.

One layer 504, such as a dense layer 504, may have a constraint, such as an output of a dimension N, which is equal to the dimension of the encoding. This means that means that the output of dense layer 504 may be a number of values of a dimension N that equal the number of values in an encoding. The constraint makes this dense layer a bottleneck layer because the output of the dense layer is restricted (e.g., reduced from a previous layer) to N dimensions. Additionally, dense layer 504 may have a function, such as an activation function, that forces its outputs to be between two values, such as 0 and 1. In some embodiments, a sigmoidal activation function that output values between 0 and 1 may be used. Accordingly, dense layer 504 may output N values between zero and one for each image.

Output layer 506 may be a last layer that has a dimension K. The dimension K allows for a classification to be determined. For example, the K dimensions may be non-negative outputs that sum to 1 to represent a probability distribution. The values of the output may correspond to a single classification of a character in a language. In some embodiments, the value of K may be smaller than the value of N. The representation of the dense layer 504 may act as bottleneck where the data is compressed into a compact representation. The processing step(s) between layer 504 and 506 allow a conversion of the compact representation into a non-compact classification layer. Within 504, the network may represent similar images (e.g. pixel-similarity) with similar embeddings (e.g. vector similarity). In the output layer 506, images from different characters are equally (dis-)similar from each other.

Once prediction network 202 is trained, the values received from dense layer 504 with a dimension N may be used to generate encodings in encodings model 106. In some embodiments, the values for each character may be discretized to bits to make a binary encoding. For example, server system 102 may map numbers below 0.5 to a binary value of 0 and numbers above 0.5 to a binary value of "1". Other thresholds may also be used or other methodologies, such as an average or median of values by a specific dimension for the images of a character.

Other variations may be used during training to generate the encodings. For example, server system 102 may gradually modify an activation function in dense layer 504 to make the results more and more skewed towards being exactly 0 or 1. For example, the values may be multiplied by an increasing "temperature" value before applying a soft max function. This makes the specific value of the threshold less important as more values are skewed towards 0 or 1. Another variation adds a supplementary loss term to stress that the same characters should have the same encoding in dense layer 504. Server system 102 may add a penalty during training for any pair of elements inside a training batch based on how different their K dimensional representations are. Many measures of differences can be used, such as L1 or L2 distance calculations.

Accordingly, as can be seen, encodings model 106 may be generated from output of dense layer 504, and not output layer 506. Output layer 506 is used to validate the results of prediction network 202 such that prediction network 202 is accurately predicting the character of images. This classification task may ensure that the embeddings in layer 504 are discriminable.

Encoding Examples

Figure 6:
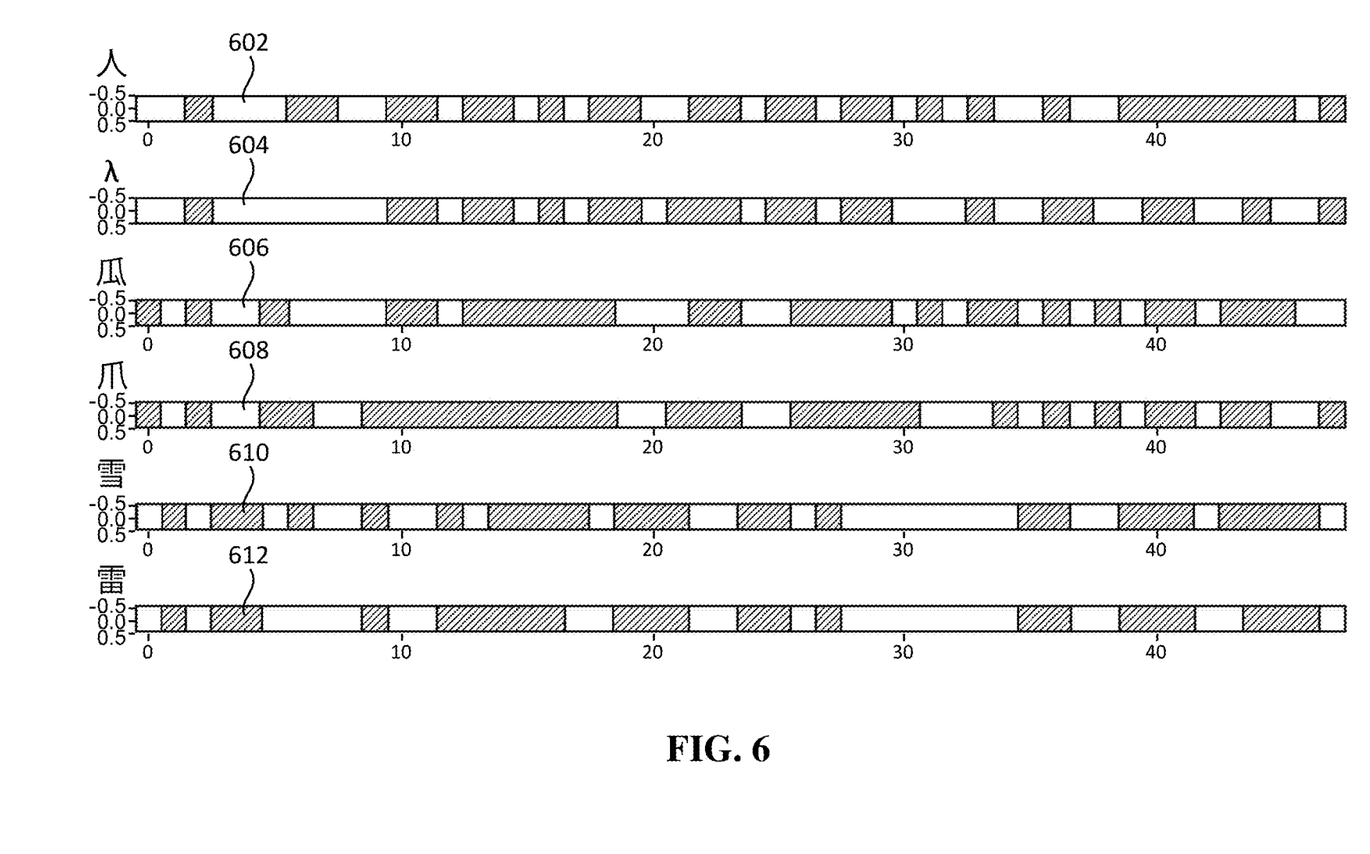
FIG. 6 depicts an example of encodings according to some embodiments.

FIG. 6 depicts an example of encodings according to some embodiments. The encodings shown at 602 to 612 may be 48-dimensional binary encodings for six symbols. The 48 values of the encodings may be represented as a value of 0 or 1. The value of 0 for a bit may be where there is no slash marks and the value of 1 for a bit is where slash marks included. Similar patterns of bits for symbols indicate that the encodings are similar. For example, for encodings 602 and 604, the number of bits is similar. Also, the encodings at 606 and 608 also include a number of similar bits as well as the encodings at 610 and 612.

Figure 7:
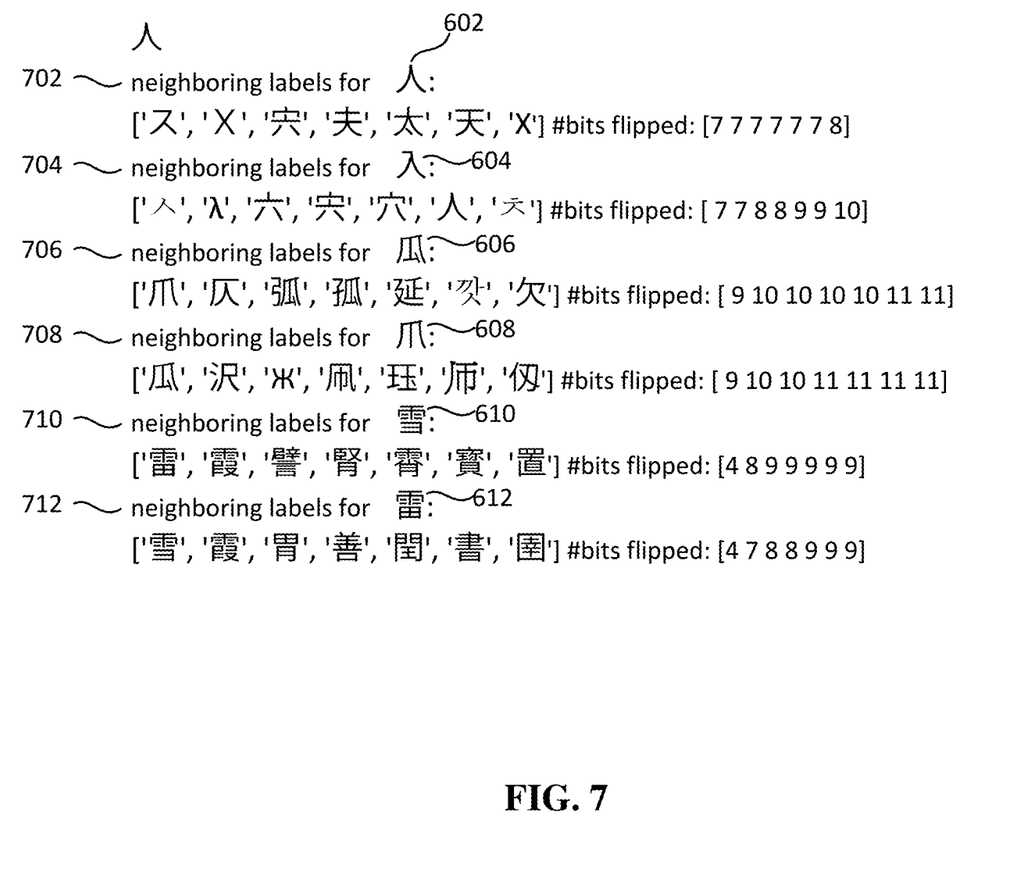
FIG. 7 depicts an example for symbols with similar binary codes according to some embodiments.

FIG. 7 depicts an example for symbols with similar binary codes according to some embodiments. At 702, neighboring encodings for symbol at 602 are shown. In this example, seven neighboring encodings for that symbol are shown. A number of bits for each respective symbol are shown as [7777778]. This means, there are seven flipped bits or different bits for the first symbol that neighbors the symbol at 602; there are seven flipped bits for the second symbol that neighbors symbol at 602, etc. Each symbol with neighboring labels at 704 to 712 for symbols 604 to 612 may include different numbers of bits that are flipped. However, the most number of bits that are flipped may be 11 out of 48 dimensions.

Conclusion

Accordingly, using encodings that are based on visually similar characters may improve the performance of application 104. This reduces the number of errors that can result, and also reduces the effect of errors that may result. Additionally, the training of the algorithm to generate encodings model 106 may be faster and easier.

Example Embodiments

In some embodiments, a method comprising: inputting, by a computing device, a set of images into a network; training, by the computing device, the network based on a classification of the set of images to one or more characters in a set of characters; obtaining, by the computing device, a set of encodings for the one or more characters based on a layer of the network that restricts an output of the layer to a number of values; and storing, by the computing device, the set of encodings for the one or more characters, wherein an encoding in the set of encodings is retrievable when a corresponding character is determined.

In some embodiments, a character in the set of characters comprises one or more glyphs.

In some embodiments, a plurality of characters in the set of characters are based on a same glyph.

In some embodiments, training the network comprises: generating an output of a character for an image in the set of images; and comparing the output of the character to a label for the image that assigns a character to the image.

In some embodiments, training the network comprises: adjusting one or more parameters in the network based on the comparing.

In some embodiments, obtaining the set of encodings comprises: restricting the output of the layer to a fixed dimension.

In some embodiments, the fixed dimension is a target dimension of a length of the encodings in the set of encodings.

In some embodiments, the fixed dimension is a number of a sequence of machine readable numbers for an encoding.

In some embodiments, an encoding in the set of encodings comprises a sequence of binary numbers.

In some embodiments, a plurality of characters that include a similar glyph are assigned similar encodings with a number of values that are in a same position with a same value.

In some embodiments, the method further comprising: receiving an image; classifying the image to a character; and selecting an encoding from the set of encodings that corresponds to the character.

In some embodiments, the layer is an internal layer in the network.

In some embodiments, the network includes an output layer after the internal layer that outputs the classification.

In some embodiments, the set of images are characters from a language.

In some embodiments, the language is based on a logographic script.

In some embodiments, a non-transitory computer-readable storage medium having stored thereon computer executable instructions, which when executed by a computing device, cause the computing device to be operable for inputting a set of images into a network; training the network based on a classification of the set of images to one or more characters in a set of characters; obtaining a set of encodings for the one or more characters based on a layer of the network that restricts an output of the layer to a number of values; and storing the set of encodings for the one or more characters, wherein an encoding in the set of encodings is retrievable when a corresponding character is determined.

In some embodiments, a plurality of characters in the set of characters are based on a same glyph.

In some embodiments, obtaining the set of encodings comprises: restricting the output of the layer to a fixed dimension.

In some embodiments, a plurality of characters that include a similar glyph are assigned similar encodings with a number of values that are in a same position with a same value.

In some embodiments, an apparatus comprising: one or more computer processors; and a computer-readable storage medium comprising instructions for controlling the one or more computer processors to be operable for: inputting a set of images into a network; training the network based on a classification of the set of images to one or more characters in a set of characters; obtaining a set of encodings for the one or more characters based on a layer of the network that restricts an output of the layer to a number of values; and storing the set of encodings for the one or more characters, wherein an encoding in the set of encodings is retrievable when a corresponding character is determined.

System

Figure 8:
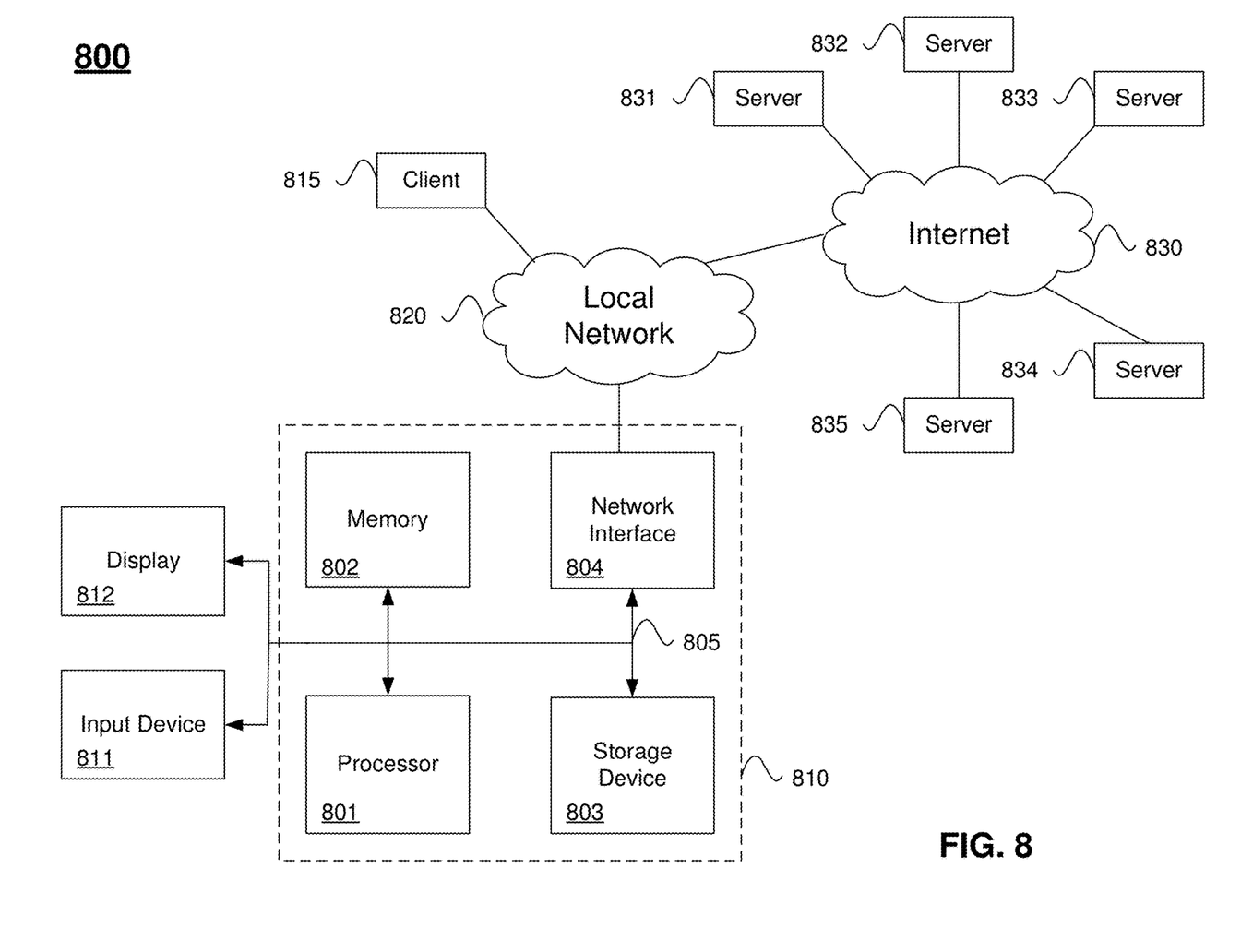
FIG. 8 illustrates an example of special purpose computer systems according to one embodiment.

FIG. 8 illustrates hardware of a special purpose computing machine according to one embodiment. An example computer system 810 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable storage mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information through the network interface 804 across a local network 820, an Intranet, or the Internet 830. In the Internet example, software components or services may reside on multiple different computer systems 810, clients 815, or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be operable to perform that which is described in some embodiments.

As used in the description herein and throughout the claims that follow. "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   inputting, by a computing device, a set of images into a network;
   training, by the computing device, the network based on a classification of the set of images to one or more characters in a set of characters;
   obtaining, by the computing device, a set of encodings for the one or more characters based on a layer of the network that restricts an output of the layer to a number of values; and
   storing, by the computing device, the set of encodings for the one or more characters, wherein an encoding in the set of encodings is retrievable when a corresponding character is determined.

2. The method of claim 1, wherein a character in the set of characters comprises one or more glyphs.

3. The method of claim 1, wherein a plurality of characters in the set of characters are based on a same glyph.

4. The method of claim 1, wherein training the network comprises:
   generating an output of a character for an image in the set of images; and
   comparing the output of the character to a label for the image that assigns a character to the image.

5. The method of claim 4, wherein training the network comprises:
   adjusting one or more parameters in the network based on the comparing.

6. The method of claim 1, wherein obtaining the set of encodings comprises:
   restricting the output of the layer to a fixed dimension.

7. The method of claim 6, wherein the fixed dimension is a target dimension of a length of the encodings in the set of encodings.

8. The method of claim 7, wherein the fixed dimension is a number of a sequence of machine readable numbers for an encoding.

9. The method of claim 1, wherein an encoding in the set of encodings comprises a sequence of binary numbers.

10. The method of claim 1, wherein a plurality of characters that include a similar glyph are assigned similar encodings with a number of values that are in a same position with a same value.

11. The method of claim 1, further comprising:
    receiving an image;
    classifying the image to a character; and
    selecting an encoding from the set of encodings that corresponds to the character.

12. The method of claim 1, wherein the layer is an internal layer in the network.

13. The method of claim 12, wherein the network includes an output layer after the internal layer that outputs the classification.

14. The method of claim 1, wherein the set of images are characters from a language.

15. The method of claim 14, wherein the language is based on a logographic script.

16. A non-transitory computer-readable storage medium having stored thereon computer executable instructions, which when executed by a computing device, cause the computing device to be operable for:
    inputting a set of images into a network;
    training the network based on a classification of the set of images to one or more characters in a set of characters;
    obtaining a set of encodings for the one or more characters based on a layer of the network that restricts an output of the layer to a number of values; and storing the set of encodings for the one or more characters, wherein an encoding in the set of encodings is retrievable when a corresponding character is determined.

17. The non-transitory computer-readable storage medium of claim 16, wherein a plurality of characters in the set of characters are based on a same glyph.

18. The non-transitory computer-readable storage medium of claim 16, wherein obtaining the set of encodings comprises:
   restricting the output of the layer to a fixed dimension.

19. The non-transitory computer-readable storage medium of claim 16, wherein a plurality of characters that include a similar glyph are assigned similar encodings with a number of values that are in a same position with a same value.

20. An apparatus comprising:
   one or more computer processors; and
   a computer-readable storage medium comprising instructions for controlling the one or more computer processors to be operable for:
   inputting a set of images into a network;
   training the network based on a classification of the set of images to one or more characters in a set of characters;
   obtaining a set of encodings for the one or more characters based on a layer of the network that restricts an output of the layer to a number of values; and
   storing the set of encodings for the one or more characters, wherein an encoding in the set of encodings is retrievable when a corresponding character is determined.

\* \* \* \* \*